(12) United States Patent
Laifenfeld et al.

(10) Patent No.: US 9,578,047 B2
(45) Date of Patent: Feb. 21, 2017

(54) METHOD AND SYSTEM FOR REFLECTOMETRY BASED COMMUNICATION NETWORK MONITORING, INTRUSION DETECTION, AND MESSAGE AUTHENTICATION

(71) Applicant: GM GLOBAL TECHNOLOGY OPERATIONS LLC, Detroit, MI (US)

(72) Inventors: Moshe Laifenfeld, Haifa (IL); Yuval Polevoy, Holon (IL); Timothy D. Julson, Rochester Hills, MI (US); Kevin M. Baltes, Wixom, MI (US); Omer Cohen, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/595,584

(22) Filed: Jan. 13, 2015

(65) Prior Publication Data
US 2016/0205117 A1    Jul. 14, 2016

(51) Int. Cl.
 *H04L 29/06* (2006.01)
 *H04B 1/3822* (2015.01)
 *H04L 29/08* (2006.01)

(52) U.S. Cl.
 CPC ........ *H04L 63/1416* (2013.01); *H04B 1/3822* (2013.01); *H04L 63/08* (2013.01); *H04L 63/123* (2013.01); *H04L 63/1425* (2013.01); *H04L 67/12* (2013.01)

(58) Field of Classification Search
 CPC .. H04L 63/1416; H04L 63/1433; H04L 63/08; H04L 63/123; H04L 67/12; G06F 21/577; H04B 1/3822
 USPC ...................................................... 726/23, 25
 See application file for complete search history.

(56) References Cited

U.S. PATENT DOCUMENTS

| | | | | |
|---|---|---|---|---|
| 3,727,206 A | * | 4/1973 | Geil ....................... | G08B 13/20 340/544 |
| 5,808,544 A | * | 9/1998 | Kani .................. | B60R 25/1009 340/426.26 |
| 6,452,403 B1 | * | 9/2002 | Hanschu ............. | B60R 25/1009 324/555 |
| 6,609,051 B2 | * | 8/2003 | Fiechter .............. | G06F 11/2263 700/31 |
| 2005/0099271 A1 | * | 5/2005 | Sasaki ................ | B60R 25/1004 340/426.1 |
| 2005/0099273 A1 | * | 5/2005 | Shimomura ........ | B60R 25/1004 340/426.1 |

(Continued)

*Primary Examiner* — Kambiz Zand
*Assistant Examiner* — Tongoc Tran
(74) *Attorney, Agent, or Firm* — Lorenz & Kopf, LLP

(57) ABSTRACT

Systems and methods are provided for monitoring and detecting intrusions and authenticating messages on a communication network of a vehicle. A plurality of signals transmitted over communications network between an electronic control module and a remote electronic module are monitored. Reflectometry feature sets are extracted from the plurality of signals and compared to a repository of predetermined communication network feature sets to generate a mismatch value. The mismatch value is compared to a predetermined threshold range and an authenticated event occurs when the mismatch value is within the predetermined threshold range. When the mismatch value is outside the predetermined threshold range, a flagged event occurs and is recorded.

20 Claims, 4 Drawing Sheets

(56) References Cited

U.S. PATENT DOCUMENTS

| | | | |
|---|---|---|---|
| 2007/0260911 A1* | 11/2007 | Marilly | H04L 41/0663 714/4.1 |
| 2008/0186870 A1* | 8/2008 | Butts | H04L 41/0659 370/252 |
| 2008/0195870 A1* | 8/2008 | Posamentier | G06F 21/32 713/186 |
| 2012/0195426 A1* | 8/2012 | White | G06F 21/84 380/210 |
| 2014/0250530 A1* | 9/2014 | Moeller | H04L 63/1408 726/23 |
| 2014/0250531 A1* | 9/2014 | Moeller | H04L 63/1425 726/23 |
| 2014/0337976 A1* | 11/2014 | Moeller | H04L 63/1425 726/23 |
| 2015/0013454 A1* | 1/2015 | Lee | B60R 25/1001 73/509 |
| 2015/0166010 A1* | 6/2015 | Kyung | B60R 25/10 340/426.24 |
| 2015/0175126 A1* | 6/2015 | Chun | B60R 25/1009 340/426.24 |

* cited by examiner

METHOD AND SYSTEM FOR REFLECTOMETRY BASED COMMUNICATION NETWORK MONITORING, INTRUSION DETECTION, AND MESSAGE AUTHENTICATION

TECHNICAL FIELD

The technical field generally relates to communication network security, and more particularly relates to methods and systems for vehicle communication network security using time-domain reflectometry.

BACKGROUND

Most vehicles, such as automobiles, contain communication networks to facilitate electrical communication between various vehicle systems. For instance, communication networks allow electronic control modules, devices, vehicle actuators, or similar devices on the communication network to communicate with one another within a vehicle without a host computer. In addition, multiple independent vehicle subsystems such as transmission, airbags, antilock brakes, cruise control, power steering, power windows, or power locks may also be in communication with one another over a common communication network. As more and more vehicle subsystems are interconnected over communication networks, the reliability and security of these communication networks becomes essential.

Accordingly, it is desirable to provide systems and methods for monitoring and detecting intrusions on vehicle communication networks. Other desirable features and characteristics of the present invention will become apparent from the subsequent detailed description and the appended claims, taken in conjunction with the accompanying drawings and the foregoing technical field and background.

SUMMARY

Various embodiments of a method and a system for detecting intrusions and authenticating messages on a communications network and embodiments of a vehicle equipped with a system for detecting intrusions and authenticating messages on a communications network are disclosed herein.

In a first non-limiting embodiment, the method includes, but is not limited to the step of monitoring, with a reflectometer, a plurality of communication channels on the communication network. The communication channels each transmit a plurality of signals between an electronic control module and a remote electronic control module. The method further includes, but is not limited to, extracting a reflectometry feature set from each of the plurality of signals transmitted over each of the communication channels. The method further includes, but is not limited to, comparing the extracted reflectometry feature sets to a repository of predetermined communication network feature sets to generate a mismatch value. The method further includes, but is not limited to, determining that an authenticated event has occurred when the mismatch value is within a predetermined threshold range and continuing to monitor the plurality of communication channels. The method further includes, but is not limited to, determining that a flagged event has occurred when the mismatch value is outside the predetermined threshold range. The method still further includes, but is not limited to recording the flagged event in a memory module.

In another non-limiting embodiment, the system includes, but is not limited to, an electronic control module having a first processor module and a first memory module. The electronic control module is configured to send and receive a plurality of signals on a plurality of communication channels of the communications network. A remote electronic control module is configured to send and receive the plurality of signals from the electronic control module over the communication channels. The system further includes, but is not limited to, a repository of predetermined communication network feature sets. The system further includes, but is not limited to, a reflectometer having a second processor module and a second memory module. The reflectometer is configured to extract a reflectometry feature set from each of the plurality of signals transmitted over the communication channels and calculate a mismatch value corresponding to the difference between the reflectometry feature set and the corresponding communication network feature set. An authenticated event occurs when the mismatch value is within a predetermined threshold range and a flagged event occurs when the mismatch value is outside the predetermined threshold range. The flagged event is recorded in at least one of the first memory module and the second memory module.

In another non-limiting embodiment, the vehicle includes, but is not limited to, a communications network. The vehicle further includes, but is not limited to, a system for monitoring and detecting intrusions on the communications network. The system includes, but is not limited to, an electronic control module having a first processor module and a first memory module. The electronic control module is configured to send and receive a plurality of signals on a plurality of communication channels of the communications network. A remote electronic control module is configured to send and receive the plurality of signals from the electronic control module over the communication channels. The system further includes, but is not limited to, a repository of predetermined communication network feature sets. The system further includes, but is not limited to, a reflectometer having a second processor module and a second memory module. The reflectometer is configured to extract a reflectometry feature set from each of the plurality of signals transmitted over the communication channels and calculate a mismatch value corresponding to the difference between the reflectometry feature set and the corresponding communication network feature set. An authenticated event occurs when the mismatch value is within a predetermined threshold range and a flagged event occurs when the mismatch value is outside the predetermined threshold range. The flagged event is recorded in at least one of the first memory module and the second memory module.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
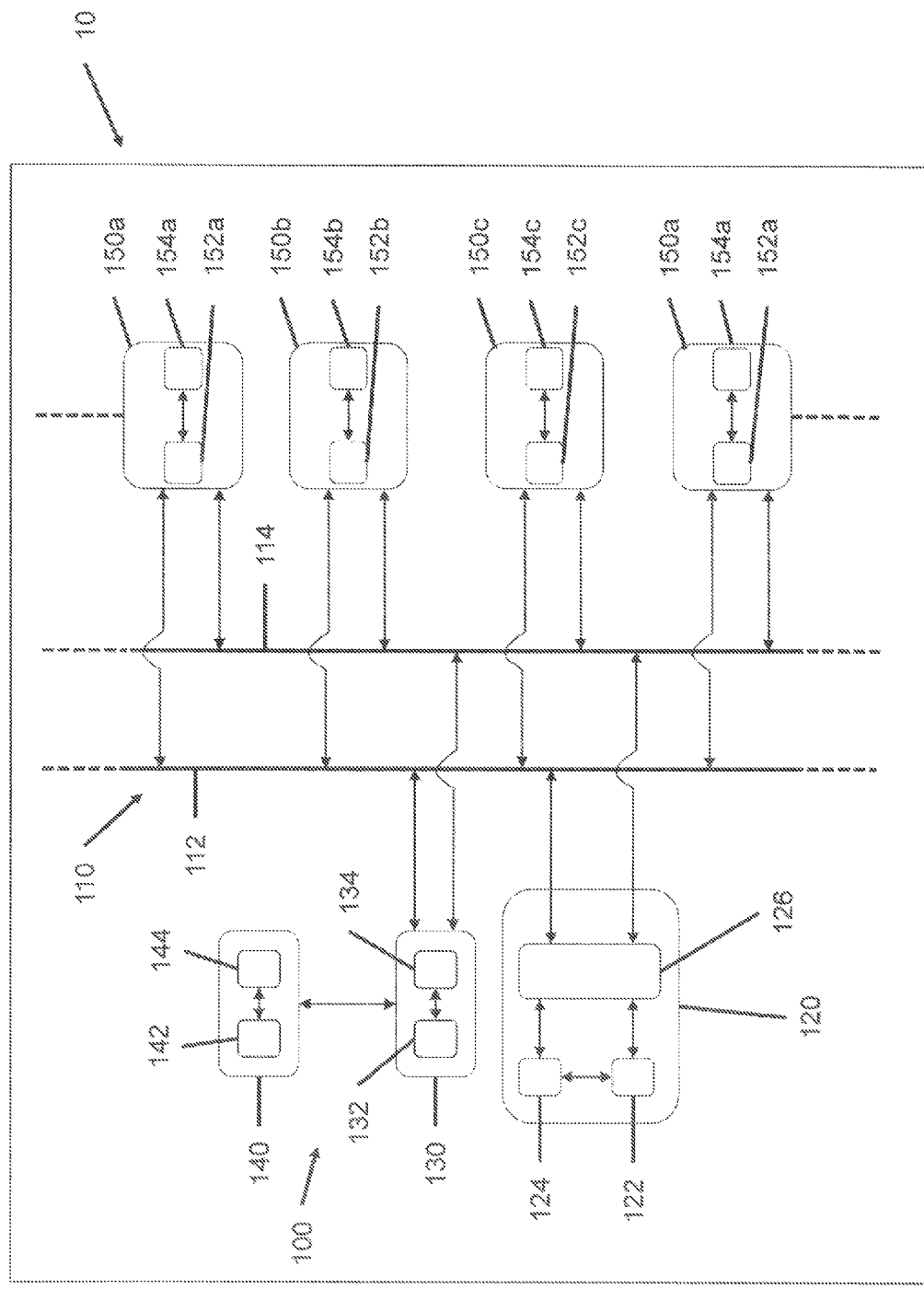
FIG. 1 illustrates a vehicle having a system for monitoring and detecting intrusions and authenticating messages on a communications network in accordance with an exemplary embodiment.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor module (shared, dedicated, or group) and memory module that executes one or more software or firmware programs, a combinational logic circuit, and/or other suitable components that provide the described functionality.

Referring to the figures, wherein like numerals indicate like parts throughout the several views, a vehicle 10 having a system 100 for monitoring and detecting intrusions and authenticating messages on a communication network 110 is shown herein. In the exemplary embodiments, the vehicle 10 is an automobile. However, the system 100 may be implemented and/or utilized in other types of vehicles or in non-vehicle applications. For instance, other vehicles include, but are not limited to, aircraft, spacecraft, buses, trains, etc. As shown in FIG. 1, the system 100 includes a communications network 110 and an electronic control module 120 having a first processor module 122, a first memory module 124, and a communication network transceiver 126. The system 100 also includes a reflectometer 130 having a second processor module 132 and a second memory module 134 and a cyber security anomaly detection module 140 having a third processor module 142 and a third memory module 144. A plurality of remote electronic modules 150a-d are also in communication with the communications network 110.

With reference to FIG. 1, a non-limiting embodiment of the system 100 is provided. The vehicle 10 includes the communications network 110 to allow electronic control modules 120 and various vehicle subsystems 150-153 to communicate with one another. In an example, the communications network 110 is a CAN network, however one skilled in the art will appreciate that various communication networks such as FlexRay, A2B, Switched Ethernet, or other known communication networks may be implemented as the communication network 110. Thus, the present disclosure is not limited to any specific type of communication network or protocol. Furthermore, while the components of the system 100 are depicted in communication through a direct connection for simplicity, one skilled in the art will appreciate that the system 100 may be implemented over the communication network 110 in various arrangements and electrical connections. As known to those skilled in the art, the system 100 may include various electronic components (not shown) in its implementation and on the communication network 110.

The vehicle 10 uses the communication network 110 to facilitate communication between the electronic control module 120 and various vehicle subsystems 150a-d. One skilled in the art will appreciate that the vehicle subsystems 150a-d may include transmission, airbags, antilock brakes, cruise control, and power steering, sensors, actuators, or specific devices such as power windows and power locks. The vehicle subsystems 150a-d may include processor modules 152a-d and memory modules 154a-d to facilitate sending and receiving of signals over the communication network 110. In an example, four vehicle subsystems 150a-d are depicted, however one skilled in the art will appreciate that additional subsystems may be connected to the communication network 110.

As known to those skilled in the art, the CAN communication network 110 includes a CAN-hi line 112 and a CAN-low line 114. In the non-limiting embodiment of FIG. 1, the electronic control module 120, reflectometer 130, and vehicle subsystems 150a-d are all connected to the CAN-hi line 112 and the CAN-low line 114 of the CAN communication network 110. According to CAN protocols, signals transmitted over the CAN communication network 110 are transmitted to all systems connected to the CAN communication network 110. Accordingly, all signals on the CAN communication network 110 are "seen" by all the systems on the CAN communication network 110. Stated differently, every system on the CAN communication network 110 can both consume and broadcast signals to and from the other systems on the CAN communication network 110. In other words the CAN communication network 110 is a shared media between nodes on the CAN communication network 110.

The electronic control module 120 has the first processor module 122, the first memory module 124, and the communication network transceiver 126. The communication network transceiver 126 converts the data stream from the processor module 122 into the CAN protocol for transmission over the CAN communication network 110. The electronic control module 120 transmits instruction signals to the vehicle subsystems 150a-d to, for example, lock/unlock doors, actuate windows, etc. The electronic control module 120 may also receive feedback signals from the vehicle subsystems 150a-d, data from sensors on the CAN communication network 110, or instructions from the vehicle subsystems 150a-d.

The reflectometer 130 includes the second processing module 132 and the second memory module 134. In the non-limiting embodiment of FIG. 1, the reflectometer 130 is connected to the CAN communication network 110 to monitor the signals transmitted over the CAN-hi line 112 and the CAN-low line 114. In a non-limiting embodiment the reflectometer 130 is a time domain reflectometer. Other non-limiting examples of the reflectometer 130 include a frequency domain reflectometer, a spread-spectrum time domain reflectometer, and a noise domain reflectometer.

Reflectometry measures reflections along a conductor. Measuring these reflections allows the reflectometer 130 to generate feature sets corresponding to physical properties of the signals and communications themselves. The physical properties of the CAN communication network 110 such as loads, transistors, wiring, etc., impact the signals and communications sent over the CAN communication network 110. Reflection, absorption, and other effects between two points or nodes in the CAN communication network 110 can distort the signals and communications in a unique fashion. As such, by observing the distortion of the signals and communications sent over the CAN communication network 110, reflectometry may be used to characterize and locate faults in the wiring, connections, and electrical paths of the CAN communication network 110. Additionally, reflectometry may be used to monitor semiconductor devices and determine the location of opens and shorts in the communication network 110. One skilled in the art will appreciate that there are many algorithms and methods to implement reflectometry.

The Open Systems Interconnection (OSI) model is a conceptual model that characterizes and standardized the internal functions of a communication system by partitioning it into abstraction layers. One skilled in the art will appreciate that a layer serves the layer above it and is in turn served by the layer below it. The lowest layer is the physical layer which is concerned with the transmission and reception of the raw bit stream over a physical medium. It describes the electrical/optical, mechanical, and functional interfaces to the physical medium, and carries the signals for all of the higher layers.

As detailed above, reflectometry methods may be used to monitor the physical characteristics of the signals communicated over the CAN communication network 110 to extract a reflectometry feature set. The reflectometry feature set may then be used to correlate the physical changes in the signals with errors and faults in the overall system.

When the electrical connections between devices on the CAN communication network 110 change, such as when an intrusive or foreign device is added to the CAN communication network 110, the reflectometry feature set of a signal transmitted over the CAN communication network 110 will change relative to an identical signal that was previously transmitted. As such, the reflectometry feature sets of signals may be used as indicators of intrusions on the CAN communication network 110.

Reflectometry feature sets may also be used to authenticate the source of a signal transmitted over the CAN communication network 110. Once the CAN communication network 110 is initially established, a repository of predetermined CAN communication network feature sets can be established. It can therefore be assumed that the reflectometry feature set of a signal transmitted over the CAN communication network 110 will not substantially change throughout the normal operation of the CAN communication network 110 absent an error, fault, or intrusion in the system. However, some variation is expected within, for example, a predetermined threshold range. One skilled in the art will appreciate that the predetermined threshold range is a design choice and should be broad enough to encompass physical changes indicative of an intrusion, but not so wide as to identify a large number of false positives or improperly categorize genuine system faults.

As such, in a non-limiting embodiment the reflectometry feature set extracted by the reflectometer 130 is compared to the predetermined CAN communication network feature set to generate a mismatch value. When the mismatch value is within the predetermined threshold range, an authenticated event occurs, and the signal is categorized as authentic. However, when the mismatch value is outside the predetermined threshold range, a flagged event occurs, the signal is flagged, and stored in at least one of the first memory module 124 and the second memory module 134 for further analysis.

In a non-limiting embodiment, when the flagged event occurs, the reflectometry feature set is sent to the cyber security anomaly detection module 140. The cyber security anomaly detection module 140 may then be used to make a determination as to whether an intrusion occurred based on the reflectometry feature set. In a non-limiting embodiment, the cyber security anomaly detection module 140 stores a plurality of reflectometry feature sets in the third memory module 144 as a history of flagged events and determines if an intrusion occurred based on the history of the flagged events.

In a non-limiting embodiment, a plurality of reflectometers 130 are located throughout the CAN communication network 110. Each of the plurality of reflectometers 130 generates a reflectometry feature set that is sent to a single cyber security anomaly detection module 140. The combined reflectometry feature sets are utilized by the cyber security anomaly detection module 140 to make a determination as to whether an intrusion occurred and additionally a location of the intrusion within the communication network 110.

In a non-limiting embodiment, the repository of predetermined communication network feature sets is based on an initial communication network baseline, such as when the vehicle 10 is assembled, activated a first time, or another baseline event. In a non-limiting embodiment, the repository of predetermined communication network feature sets is recalibrated based on a recalibration event. Examples of a recalibration event include, but are not limited to, vehicle maintenance, replacement of a vehicle subsystem 150a-d, or other changes to the CAN communication network 110 which would impact the physical nature of signals transmitted on the CAN communication network 110.

In a non-limiting embodiment, a repository of predetermined signal signatures is established. Each of the predetermined signal signatures corresponds to one of the vehicle subsystems 150a-d such that each vehicle subsystem 150a-d has a unique predetermined signal signature. The reflectometer 130 extracts a signal signature for each signal received by the electronic control module 120 over the communication network 110. The signal signature is compared to the predetermined signal signature to generate a signature mismatch value. When the signature mismatch value is within the predetermined signature range, the authenticated event occurs, the signal is categorized as authentic, and the system 100 returns to watch for additional signals. However, when the signature mismatch value is outside the predetermined signature range, the flagged event occurs, the signal is flagged, and stored in at least one of the first memory module 124 and the second memory module 134 for further analysis.

In a non-limiting embodiment the reflectometer 130 extracts the signal signature for each signal transmitted over the communication network 110. The signal signature is compared to the predetermined signal signature to generate a signature mismatch value. When the signature mismatch value is within the predetermined signature range, the authenticated event occurs, the signal is categorized as authentic, and the system 100 returns to watch for additional signals. However, when the signature mismatch value is outside the predetermined signature range, the flagged event occurs, the signal is flagged, and stored in at least one of the first memory module 124 and the second memory module 134 for further analysis.

In a non-limiting embodiment, when the signature mismatch value is within the predetermined signature range and the authenticated event has occurred, the content of the signal is compared to the types of signals and commands normally associated with a source of the signal. The vehicle subsystem 150a-d associated with the signal corresponding to the authenticated event is identified. A content of the signal corresponding to the authenticated event is compared to a command from a command repository associated with the identified vehicle subsystem 150*a-d*. The command repository is stored in at least one of the first memory module 124 and the second memory module 134 and has a plurality of commands. When the content of the signal matches a command from the command repository, the authenticated event is confirmed. When the content of the signal does not match a command in the command repository, the flagged event occurs.

A non-limiting example is when a signal to "unlock doors" is sent over the CAN communication network 110, the signal is authenticated as genuine. The system 100 identifies that the signal came from the car radio. The system 100 compares the "unlock doors" command to the types of commands associated with the car radio. If the content of the signal matches a command in the command repository, the authenticated event is confirmed. If the content of the signal does not match a command in the command repository, the flagged event occurs. When this happens, the signal is flagged, and stored in at least one of the first memory module 124 and the second memory module 134 for further analysis. In a non-limiting embodiment, the repository of signals and commands associated with devices on the CAN communication network 110 is stored in at least one of the first memory module 124 and the second memory module 134 so that the content of the signals sent over the CAN communication network 110 can be further validated.

Figure 2:
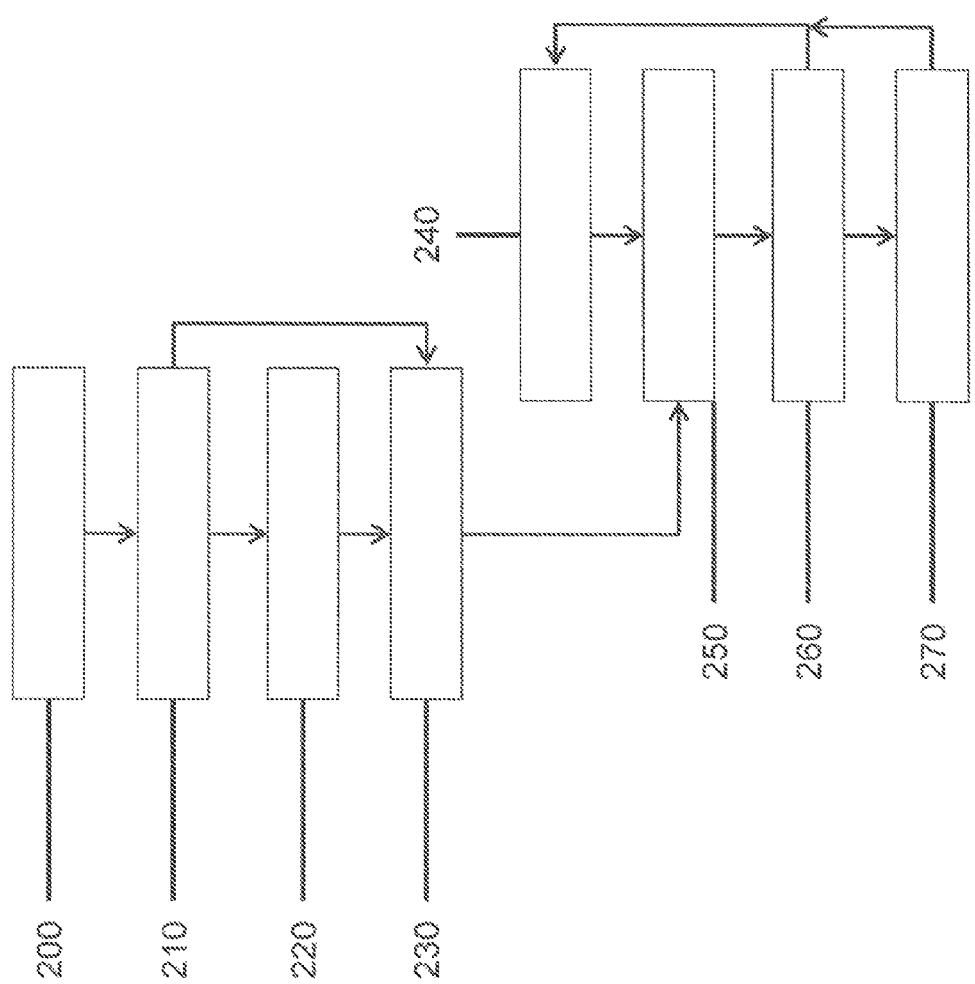
FIG. 2 is a flow chart illustrating a non-limiting method for monitoring and detecting intrusions and authenticating messages on a communications network with the system shown in FIG. 1.

Referring now to FIG. 2, and with continued reference to FIG. 1, a flowchart illustrates a method performed by the system 100 of FIG. 1 in accordance with the present disclosure. As can be appreciated in light of the disclosure, the order of operation within the method is not limited to the sequential execution as illustrated in FIG. 2, but may be performed in one or more varying orders as applicable and in accordance with the requirements of a given application.

In various exemplary embodiments, the system 100 and method are run based on predetermined events, and/or can run continuously during operation of the vehicle 10. The method starts at 200 with the establishment of the repository of predetermined communication network feature sets based on an initial communication network baseline. At 210, if a recalibration event such as the replacement of the electronic control module 120 occurs, the method proceeds to 220 and recalibrates the repository of predetermined communication network feature sets before proceeding to 230. If the recalibration event has not occurred, the method bypasses the recalibration of 220 and proceeds to 230. At 230 the repository of predetermined communication network feature sets is up to date and ready to be used by the system 100.

At 240, a signal or communication is transmitted over the CAN communication network 110 and monitored by the system 100. At 250, the reflectometry feature set is extracted from the signal and compared to the predetermined communication network feature set from the repository from 230 to generate a mismatch value for the given signal. At 260, if the mismatch value is within the predetermined threshold range, an authenticated event has occurred and the method proceeds back to 240 to watch for another signal to be transmitted over the CAN communication network 110. If the mismatch value is outside of the predetermined threshold range, a flagged event has occurred and the method proceeds to 270. At 270, the flagged event is recorded in at least one of the first memory module 124 and the second memory module 134 for further analysis and the method proceeds back to 240 to watch for another signal to be transmitted over the CAN communication network 110.

In a non-limiting embodiment, at 270 the extracted timed domain reflectometry feature set may be sent to the cyber security anomaly detection module 140. The cyber security anomaly detection module 140 may then be used to make a determination as to whether an intrusion occurred based on the reflectometry feature set. In a non-limiting embodiment, at 270 the cyber security anomaly detection module 140 stores a plurality of reflectometry feature sets as a history of flagged events and determines if an intrusion occurred based on the history of the flagged events. In a non-limiting embodiment, the flagged event is recorded in the third memory module 144 of the cyber security anomaly detection module 140.

In a non-limiting embodiment at 270 the extracted timed domain reflectometry feature set may be sent to a remote cyber security anomaly detection network server (not shown) or a cloud computing network. The remote cyber security anomaly detection network server may be used to collect extracted timed domain reflectometry feature sets from a plurality of vehicles to make determinations as to whether intrusions occurred based on the extracted timed domain reflectometry feature sets. The remote cyber security anomaly detection network server may be used to produce analytics, threat warnings, and countermeasures that may be sent from the remote cyber security anomaly detection network server to the plurality of vehicles.

In this way, the system 100 uses the reflectometry to monitor the physical characteristics of signals transmitted over CAN communication network 110. The extracted reflectometry feature sets are compared to the repository of predetermined communication network feature sets to generate the mismatch value. When the mismatch value is within the predetermined threshold range, the authenticated event has occurred with respect to the signal. When the mismatch value is outside the predetermined threshold range, the flagged event has occurred and the flagged event is stored in at least one of the first memory module 124 and the second memory module 134 for further analysis.

Figure 3:
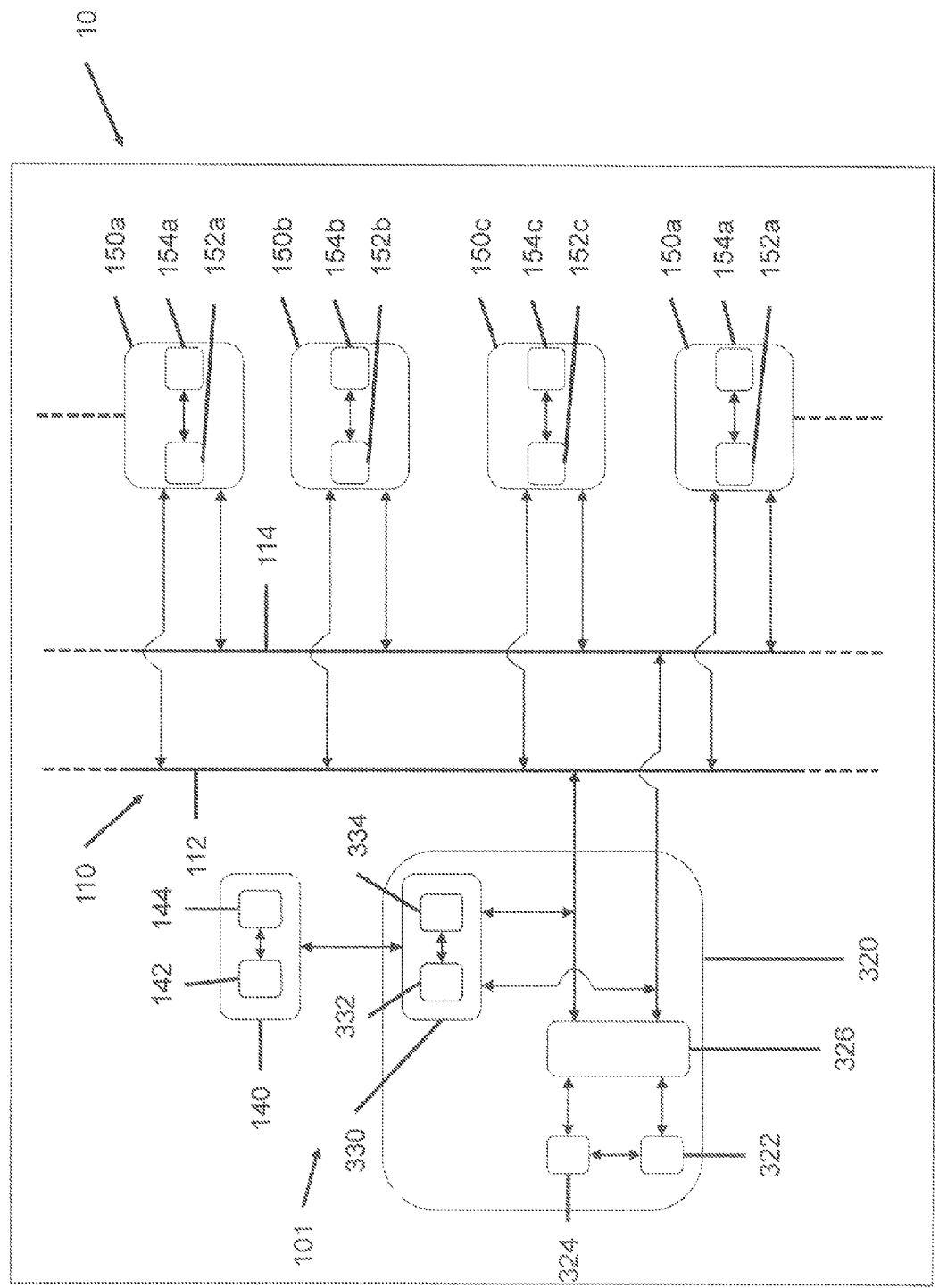
FIG. 3 illustrates the system for monitoring and detecting intrusions and authenticating messages on the communications network in accordance with an exemplary embodiment.

With reference now to FIG. 3, a non-limiting embodiment of the system 101 for monitoring and detecting intrusions on a communication network 110 is provided. In this embodiment, the system 101 has an electronic control module 320 that includes a reflectometer 330. As similar components are used in the system 101 relative to the system 100, similar reference numerals will be used. As with the non-limiting embodiment from FIG. 1, the system 101 includes the communication network 110, the cyber security anomaly detection module 140 and the vehicle subsystems 150*a-d*.

The electronic control module 320 has a fourth processor module 322, a fourth memory module 324, and a transceiver module 326. The electronic also includes the reflectometer 330 which has a fifth processor module 332 and a fifth memory module 334. The reflectometer 330 monitors the signals that are transmitted and received by the electronic control module 320 and in a non-limiting embodiment receives the signals as they are received and transmitted by the transceiver module 326.

In this embodiment, the electronic control module 320 and specifically the reflectometer 330 is in communication with the cyber security anomaly detection module 140.

Similar to the non-limiting embodiment of FIG. 1, the system 101 monitors the signals transmitted over the communication network 110. The reflectometry feature set extracted by the reflectometer 330 is compared to the predetermined communication network feature set to generate the mismatch value. When the mismatch value is within the predetermined threshold range, the authenticated event occurs, and the signal is categorized as authentic. However, when the mismatch value is outside the predetermined threshold range, the flagged event occurs, the signal is flagged, and stored in at least one of the fourth memory module 324 and the fifth memory module 334 for further analysis.

In a non-limiting embodiment, when the flagged event occurs, the reflectometry feature set is sent to the cyber security anomaly detection module 140. The cyber security anomaly detection module 140 may then be used to make a determination as to whether the intrusion occurred based on the reflectometry feature set. In a non-limiting embodiment, the cyber security anomaly detection module 140 stores a plurality of reflectometry feature sets as the history of flagged events and determines if the intrusion occurred based on the history of the flagged events. In a non-limiting embodiment, the flagged event is recorded in the third memory module 144 of the cyber security anomaly detection module 140.

In a non-limiting embodiment, the repository of predetermined communication network feature sets is based on an initial communication network baseline, such as when a vehicle 10 is assembled, activated a first time, or another baseline event. In a non-limiting embodiment, the repository of predetermined communication network feature sets is recalibrated based on a recalibration event. Examples of a recalibration event include, but are not limited to, vehicle maintenance, replacement of a vehicle subsystem 150a-d, or other changes to the CAN communication network 110 which would impact the physical nature of signals transmitted on the CAN communication network 110.

In a non-limiting embodiment, the repository of predetermined signal signatures is established. Each of the predetermined signal signatures corresponds to one of the vehicle subsystems 150a-d such that each vehicle subsystem 150a-d has a unique predetermined signal signature. The reflectometer 330 extracts a signal signature for each signal received by the electronic control module 320 over the communication network 110. The signal signature is compared to the predetermined signal signature to generate a signature mismatch value. When the signature mismatch value is within the predetermined signature range, the authenticated event occurs, the signal is categorized as authentic, and the system 101 returns to watch for additional signals. However, when the signature mismatch value is outside the predetermined signature range, the flagged event occurs, the signal is flagged, and stored in at least one of the fourth memory module 324 and the fifth memory module 334 for further analysis.

In a non-limiting embodiment the reflectometer 330 extracts the signal signature for each signal transmitted over the communication network 110. The signal signature is compared to the predetermined signal signature to generate a signature mismatch value. When the signature mismatch value is within the predetermined signature range, the authenticated event occurs, the signal is categorized as authentic, and the system 101 returns to watch for additional signals. However, when the signature mismatch value is outside the predetermined signature range, the flagged event occurs, the signal is flagged, and stored in at least one of the fourth memory module 324 and the fifth memory module 334 for further analysis.

In a non-limiting embodiment, when the signature mismatch value is within the predetermined signature range and the authenticated event has occurred, the content of the signal is compared to the types of signals and commands normally associated with a source of the signal. The vehicle subsystem 150a-d associated with the signal corresponding to the authenticated event is identified. A content of the signal corresponding to the authenticated event is compared to a command from a command repository associated with the identified vehicle subsystem 150a-d. The command repository is stored in at least one of the fourth memory module 324 and the fifth memory module 334 and has a plurality of commands. When the content of the signal matches a command from the command repository, the authenticated event is confirmed. When the content of the signal does not match a command in the command repository, the flagged event occurs.

A non-limiting example is when a signal to "unlock doors" is sent over the CAN communication network 110, the signal is authenticated as genuine. The system 101 identifies that the signal came from the car radio. The system 101 compares the "unlock doors" command to the types of commands associated with the car radio. If the content of the signal matches a command in the command repository, the authenticated event is confirmed. If the content of the signal does not match a command in the command repository, the flagged event occurs. When this happens, the signal is flagged, and stored in at least one of the fourth memory module 324 and the fifth memory module 334 for further analysis. In a non-limiting embodiment, the repository of signals and commands associated with devices on the CAN communication network 110 is stored in at least one of the fourth memory module 324 and the fifth memory module 334 so that the content of the signals sent over the CAN communication network 110 can be further validated.

Figure 4:
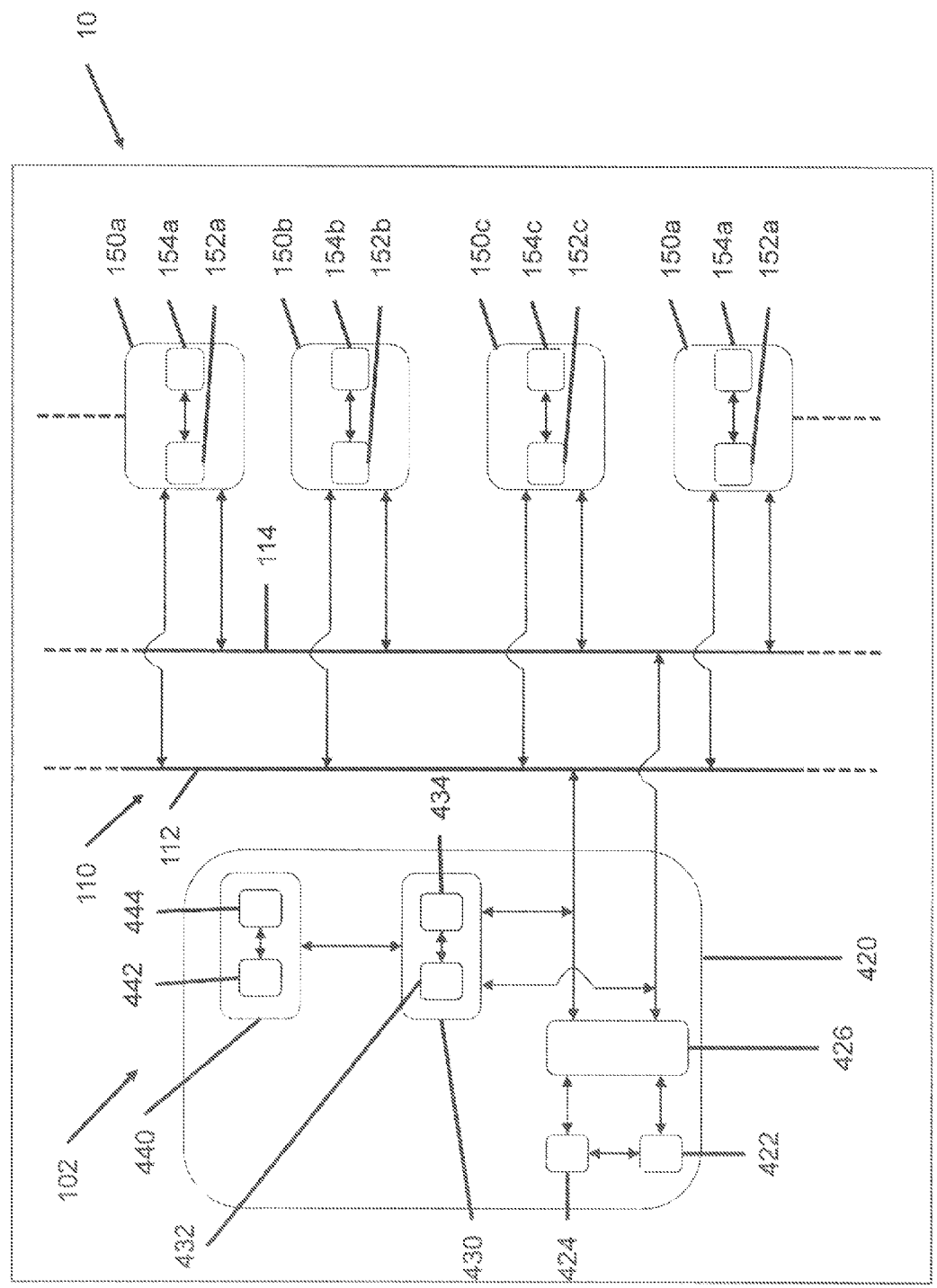
FIG. 4 illustrates the system for monitoring and detecting intrusions and authenticating messages on the communications network in accordance with an exemplary embodiment.

With reference now to FIG. 4, a non-limiting embodiment of the system 102 for monitoring and detecting intrusions on a communication network 110 is provided. In this embodiment, the system 102 has an electronic control module 420 that includes a reflectometer 430 and a cyber security anomaly detection module 440. As similar components are used in the system 102 relative to the systems 100, 101 similar reference numerals will be used. As with the non-limiting embodiments from FIGS. 1 and 3, the system 102 includes the communication network 110 and the vehicle subsystems 150a-d.

The electronic control module 420 has a sixth processor module 422, a sixth memory module 424, and a transceiver module 426. The electronic also includes the reflectometer 430 and the cyber security anomaly detection module 440. The reflectometer 430 has a seventh processor module 432 and a seventh memory module 434. The reflectometer 430 monitors the signals that are transmitted and received by the electronic control module 420 and in a non-limiting embodiment receives the signals as they are received and transmitted by the transceiver module 426.

The cyber security anomaly detection module 140 includes an eighth processor module 442 and an eighth memory module 444. In this embodiment, the reflectometer 430 is in communication with the cyber security anomaly detection module 440 within the electronic control module 420.

Similar to the non-limiting embodiments of FIGS. 1 and 3, the system 102 monitors the signals transmitted over the communication network 110. The reflectometry feature set extracted by the reflectometer 430 is compared to the predetermined communication network feature set to generate the mismatch value. When the mismatch value is within the predetermined threshold range, the authenticated event occurs, and the signal is categorized as authentic. However, when the mismatch value is outside the predetermined threshold range, the flagged event occurs, the signal is flagged, and stored in at least one of the sixth memory module 424 and the seventh memory module 434 for further analysis.

In a non-limiting embodiment, when the flagged event occurs, the reflectometry feature set is sent to the cyber security anomaly detection module 440. The cyber security anomaly detection module 440 may then be used to make a determination as to whether the intrusion occurred based on the reflectometry feature set. In a non-limiting embodiment, the cyber security anomaly detection module 440 stores a plurality of reflectometry feature sets in the eighth memory module 444 as the history of flagged events and determines if the intrusion occurred based on the history of the flagged events. In a non-limiting embodiment, the flagged event is recorded in the eighth memory module 444 of the cyber security anomaly detection module 440.

In a non-limiting embodiment, the repository of predetermined communication network feature sets is based on an initial communication network baseline, such as when the vehicle 10 is assembled, activated a first time, or another baseline event. In a non-limiting embodiment, the repository of predetermined communication network feature sets is recalibrated based on a recalibration event. Examples of a recalibration event include, but are not limited to, vehicle maintenance, replacement of a vehicle subsystem 150a-d, or other changes to the CAN communication network 110 which would impact the physical nature of signals transmitted on the CAN communication network 110.

In a non-limiting embodiment, the repository of predetermined signal signatures is established. Each of the predetermined signal signatures corresponds to one of the vehicle subsystems 150a-d such that each vehicle subsystem 150a-d has a unique predetermined signal signature. The reflectometer 430 extracts a signal signature for each signal received by the electronic control module 420 over the communication network 110. The signal signature is compared to the predetermined signal signature to generate a signature mismatch value. When the signature mismatch value is within the predetermined signature range, the authenticated event occurs, the signal is categorized as authentic, and the intrusion detection system 102 returns to watch for additional signals. However, when the signature mismatch value is outside the predetermined signature range, the flagged event occurs, the signal is flagged and stored in at least one of the sixth memory module 424 and the seventh memory module 434 for further analysis.

In a non-limiting embodiment the reflectometer 430 extracts the signal signature for each signal transmitted over the communication network 110. The signal signature is compared to the predetermined signal signature to generate a signature mismatch value. When the signature mismatch value is within the predetermined signature range, the authenticated event occurs, the signal is categorized as authentic, and the system 102 returns to watch for additional signals. However, when the signature mismatch value is outside the predetermined signature range, the flagged event occurs, the signal is flagged, and stored in at least one of the sixth memory module 424 and the seventh memory module 434 for further analysis.

In a non-limiting embodiment, when the signature mismatch value is within the predetermined signature range and the authenticated event has occurred, the content of the signal is compared to the types of signals and commands normally associated with a source of the signal. The vehicle subsystem 150a-d associated with the signal corresponding to the authenticated event is identified. A content of the signal corresponding to the authenticated event is compared to a command from a command repository associated with the identified vehicle subsystem 150a-d. The command repository is stored in at least one of the sixth memory module 424 and the seventh memory module 434 and has a plurality of commands. When the content of the signal matches a command from the command repository, the authenticated event is confirmed. When the content of the signal does not match a command in the command repository, the flagged event occurs.

A non-limiting example is when a signal to "unlock doors" is sent over the CAN communication network 110, the signal is authenticated as genuine. The system 102 identifies that the signal came from the car radio. The system 102 compares the "unlock doors" command to the types of commands associated with the car radio. If the content of the signal matches a command in the command repository, the authenticated event is confirmed. If the content of the signal does not match a command in the command repository, the flagged event occurs. When this happens, the signal is flagged, and stored in at least one of the sixth memory module 424 and the seventh memory module 434 for further analysis. In a non-limiting embodiment, the repository of signals and commands associated with devices on the CAN communication network 110 is stored in at least one of the sixth memory module 424 and the seventh memory module 434 so that the content of the signals sent over the CAN communication network 110 can be further validated.

While various exemplary embodiments have been presented in the foregoing detailed description, it should be appreciated that a vast number of variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiments. It should be understood that various changes can be made in the function and arrangement of elements without departing from the scope of the disclosure as set forth in the appended claims and the legal equivalents thereof.

What is claimed is:

1. A method of monitoring and detecting intrusions on an communications network, comprising:
    monitoring, with a reflectometer, a plurality of communication channels on the communication network, the communication channels each transmitting a plurality of signals between an electronic control module and a remote electronic control module;
    extracting a reflectometry feature set from each of the plurality of signals transmitted over each of the communication channels;
    comparing the extracted reflectometry feature sets to a repository of predetermined communication network feature sets to generate a mismatch value;
    determining that an authenticated event has occurred when the mismatch value is within a predetermined threshold range and continuing to monitor the plurality of communication channels;
    determining that a flagged event has occurred when the mismatch value is outside the predetermined threshold range; and
    recording the flagged event in a memory module.

2. The method of claim 1, further comprising:
    sending the extracted reflectometry feature sets to a cyber security anomaly detection module when the flagged event has occurred; and determining, with the cyber security anomaly detection module, that an intrusion has occurred based on at least one extracted reflectometry feature set.

3. The method of claim 2, further comprising:
storing, by the cyber security anomaly detection module, a history of flagged events and corresponding extracted reflectometry feature sets; and
determining, with the cyber security anomaly detection module, that the intrusion has occurred based on the history of flagged events and corresponding extracted reflectometry feature sets.

4. The method of claim 1, further comprising establishing the repository of predetermined communication network feature sets based on an initial communications network baseline.

5. The method of claim 1, further comprising recalibrating the repository of predetermined communication network feature sets based on a recalibration event.

6. The method of claim 1, further comprising:
identifying the remote electronic control module associated with the signal corresponding to the authenticated event;
comparing a content of the signal corresponding to the authenticated event to a command repository of a plurality of commands associated with the remote electronic control module;
confirming that the authenticated event has occurred when the content of the signal corresponding to the authenticated event matches at least one command in the command repository and continuing to monitor the plurality of communication channels;
determining that the flagged event has occurred when the content of the signal corresponding to the authenticated event does not match at least one command in the command repository; and
recording the flagged event in a memory module.

7. A system for monitoring and detecting intrusions on a communications network, comprising:
an electronic control module having a first processor module and a first memory module, the electronic control module configured to send and receive a plurality of signals on a plurality of communication channels of the communications network;
a remote electronic control module configured to send and receive the plurality of signals from the electronic control module over the communication channels;
a repository of predetermined communication network feature sets; and
a reflectometer having a second processor module and a second memory module, the reflectometer configured to extract a reflectometry feature set from each of the plurality of signals transmitted over the communication channels and calculate a mismatch value corresponding to the difference between the reflectometry feature set and the corresponding communication network feature set,
wherein an authenticated event occurs when the mismatch value is within a predetermined threshold range and a flagged event occurs when the mismatch value is outside the predetermined threshold range, the flagged event recorded in at least one of the first memory module and the second memory module.

8. The system of claim 7, further comprising a cyber security anomaly detection module having a third processor module and a third memory module, the cyber security anomaly detection module configured to receive the reflectometry feature sets when a flagged event has occurred and determine that an intrusion has occurred based on at least one reflectometry feature set.

9. The system of claim 8, wherein the cyber security anomaly detection module is configured to determine that the intrusion has occurred based on a history of flagged events and corresponding extracted reflectometry feature sets.

10. The system of claim 7, wherein the repository of predetermined communication network feature sets is established based on an initial communications network baseline.

11. The system of claim 7, wherein the repository of predetermined communication network feature sets is recalibrated based on a recalibration event.

12. The system of claim 7, further comprising:
a command repository of a plurality of commands each corresponding to one of the at least one remote electronic control module,
wherein the electronic control module is configured to identify the remote electronic control module associated with the signal corresponding to the authenticated event and compare a content of the signal to the command corresponding to the identified remote electronic control module, and the authenticated event is confirmed when the content of the signal matches the command from the command repository and the flagged event occurs when the content of the signal does not match the command in the command repository, the flagged event recorded in at least one of the electronic control module and the reflectometer.

13. The system of claim 7, further comprising:
a repository of predetermined signal signatures each corresponding to one of the at least one remote electronic control module,
wherein the reflectometer is configured to extract a signal signature corresponding to each signal received by the electronic control module and calculate a signature mismatch value corresponding to the difference between the signal signature and the predetermined signal signature, and the authenticated event occurs when signature mismatch value is within a predetermined signature range and the flagged event occurs when the signature mismatch value is outside the predetermined signature range, the flagged event recorded in at least one of the electronic control module and the reflectometer.

14. A vehicle, comprising:
a communications network; and
a system for monitoring and detecting intrusions on the communications network, the system comprising:
an electronic control module having a first processor module and a first memory module, the electronic control module configured to send and receive a plurality of signals on a plurality of communication channels of the communications network;
a remote electronic control module configured to send and receive the plurality of signals from the electronic control module over the communication channels;
a repository of predetermined communication network feature sets; and
a reflectometer having a second processor module and a second memory module, the reflectometer configured to extract a reflectometry feature set from each of the plurality of signals transmitted over the communication channels and calculate a mismatch value corresponding to the difference between the reflectometry feature set and the corresponding communication network feature set,
wherein an authenticated event occurs when the mismatch value is within a predetermined threshold range and a flagged event occurs when the mismatch value is outside the predetermined threshold range, the flagged event recorded in at least one of the first memory module and the second memory module.

15. The vehicle of claim 14, further comprising a cyber security anomaly detection module having a third processor module and a third memory module, the cyber security anomaly detection module configured to receive the reflectometry feature sets when a flagged event has occurred and determine that an intrusion has occurred based on at least one reflectometry feature set.

16. The vehicle of claim 15, further comprising a history of flagged events and the corresponding reflectometry feature sets, wherein the cyber security anomaly detection module is configured to determine that the intrusion has occurred based on the history of flagged events and corresponding extracted reflectometry feature sets.

17. The vehicle of claim 14, wherein the repository of predetermined communication network feature sets is established based on an initial communications network baseline.

18. The system of claim 14, wherein the repository of predetermined communication network feature sets is recalibrated based on a recalibration event.

19. The vehicle of claim 14, further comprising:
a command repository of a plurality of commands each corresponding to one of the at least one remote electronic control module,
wherein the electronic control module is configured to identify the remote electronic control module associated with the signal corresponding to the authenticated event and compare a content of the signal to the command corresponding to the identified remote electronic control module, and the authenticated event is confirmed when the content of the signal matches the command from the command repository and the flagged event occurs when the content of the signal does not match the command in the command repository, the flagged event recorded in at least one of the electronic control module and the reflectometer.

20. The vehicle of claim 14, further comprising:
a repository of predetermined signal signatures each corresponding to one of the at least one remote electronic control module,
wherein the reflectometer is configured to extract a signal signature corresponding to each signal received by the electronic control module and calculate a signature mismatch value corresponding to the difference between the signal signature and the predetermined signal signature, and the authenticated event occurs when signature mismatch value is within a predetermined signature range and the flagged event occurs when the signature mismatch value is outside the predetermined signature range, the flagged event recorded in at least one of the electronic control module and the reflectometer.

* * * * *